United States Patent
Yen et al.

(10) Patent No.: US 10,744,593 B2
(45) Date of Patent: Aug. 18, 2020

(54) ILLUMINATED FILM-COVERED KEYBOARD

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Fu Yen, New Taipei (TW); Hong-Chao Kan, Taipei (TW); Chia-Shiun Wu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 266 days.

(21) Appl. No.: 15/607,472

(22) Filed: May 27, 2017

(65) Prior Publication Data
US 2018/0071862 A1 Mar. 15, 2018

(30) Foreign Application Priority Data
Sep. 12, 2016 (CN) .......................... 2016 1 0818257

(51) Int. Cl.
*H01H 13/83* (2006.01)
*B23K 26/00* (2014.01)
(Continued)

(52) U.S. Cl.
CPC .............. *B23K 26/009* (2013.01); *G06C 7/09* (2013.01); *H01H 13/48* (2013.01); *H01H 13/56* (2013.01); *H01H 13/702* (2013.01); *H01H 13/7013* (2013.01); *H01H 13/83* (2013.01); *B23K 26/16* (2013.01); *B23K 26/324* (2013.01); *B23K 26/356* (2015.10); *G06C 7/02* (2013.01);
(Continued)

(58) Field of Classification Search
CPC ....... H01H 2219/062; H01H 2219/044; H01H 2221/07; F21V 33/0004; F21Y 2115/10
USPC ...................................................... 362/23.03
See application file for complete search history.

(56) References Cited

U.S. PATENT DOCUMENTS 5,573,107 A * 11/1996 Nakano ................ H01H 13/702
200/311
6,886,956 B2 * 5/2005 Parker .................. B60Q 1/0082
362/23.11
(Continued)

*Primary Examiner* — William J Carter
(74) *Attorney, Agent, or Firm* — Li & Cai Intellectual Property (USA) Office

(57) ABSTRACT

An illuminated film-covered keyboard includes: a backlit keyboard module which includes a plurality of keys that are light-permeable, and at least one backlight source; a frame body disposed on the backlit keyboard module, the frame body including a key area, wherein the top surface of each of the plurality of keys is exposed at the key area; and a cover film disposed at the key area and on top of the top surface of each of the plurality of keys, wherein the cover film includes a light-permeable film, a base color layer, a light-shielding layer that is opaque, and a protection layer disposed on a side of the light-shielding layer opposing the base color layer, and wherein the portions of the light-shielding layer that respectively correspond to each of the plurality of keys are removed so as to form a plurality of light-transparent patterns.

20 Claims, 8 Drawing Sheets

(51) Int. Cl.
*G06C 7/09* (2006.01)
*H01H 13/48* (2006.01)
*H01H 13/56* (2006.01)
*H01H 13/70* (2006.01)
*H01H 13/702* (2006.01)
B23K 26/356 (2014.01)
H01H 3/12 (2006.01)
H01H 9/18 (2006.01)
B23K 26/16 (2006.01)
B23K 26/324 (2014.01)
G06C 7/02 (2006.01)

(52) U.S. Cl.
CPC ....... *H01H 3/125* (2013.01); *H01H 2009/187* (2013.01); *H01H 2219/03* (2013.01); *H01H 2221/07* (2013.01); *H01H 2229/02* (2013.01)

(56) References Cited

U.S. PATENT DOCUMENTS 10,088,912 B2 * 10/2018 Denq .................... G06F 3/0202
2010/0147661 A1 * 6/2010 Takeda .................. H01H 13/83
200/314

* cited by examiner

ILLUMINATED FILM-COVERED KEYBOARD

BACKGROUND OF THE INVENTION

1. Field of the Invention

The instant disclosure relates to an illuminated film-covered keyboard and a cover film thereof; in particular, to an illuminated film-covered keyboard for laptop computers or mobile information equipment and a cover film thereof.

2. Description of Related Art

A prior art film-covered keyboard includes a cover film covering the frame of a keyboard so that each key is covered by the cover film. The cover film includes keycap symbols at positions respectively corresponding to each key so that users can locate the position of each key and identify the symbol and command represented by each key. The cover film is attached to a top surface of each keycap, and is flexible so that when a user presses a keycap symbol on the cover film, the pressed part of the cover film collapses and the corresponding key is then pressed.

The prior art cover film for keyboards is made by spraying a liquid in a base color of the cover film onto a flexible thin-film substrate, and then spraying a plurality of keycap symbols on the substrate, and finally forming a protection layer on the substrate.

However, spraying the keycap symbols onto the thin-film substrate requires a specially made jig or mold, which renders the manufacturing process both complicated and costly. Furthermore, since the keycap symbols are formed by spraying paints onto a substrate, the keycap symbols are subject to abrasion or peeling, that is to say, a prior art cover film can lose its function easily.

Moreover, the keycap symbols in the prior art are made of paint and hence are not light permeable. Therefore, prior art film-covered keyboards, even if equipped with backlight modules, cannot display illuminated keycap symbols.

In view of the aforementioned drawbacks of prior art film-covered keyboards, providing a structural or manufactural solution to overcome the drawbacks of prior art film-covered keyboards has become an important issue in the art.

SUMMARY OF THE INVENTION

The object of the instant disclosure is to solve the problems of a complicated manufacturing process, non-durability, and opaqueness of the prior art illuminated cover-filmed keyboards.

In order to achieve the aforementioned objects, according to an embodiment of the instant disclosure, an illuminated film-covered keyboard is provided, the illuminated film-covered keyboard comprising a backlit keyboard module, a frame body, and a cover film. The backlit keyboard module includes a plurality of keys that are light-permeable, and at least one backlight source, each of the plurality of keys having a top surface and a bottom surface opposite the top surface, the at least one backlight source being adjacent to the plurality of keys in a manner such that the light emitted from the at least one backlight source is transmitted through the plurality of keys and exits from the top surface thereof. The frame body is disposed on the backlit keyboard module, the frame body including a key area, in which the top surface of each of the plurality of keys is exposed at the key area. The cover film is disposed at the key area and on top of the top surface of each of the plurality of keys. The cover film includes a light-permeable film, a base color layer disposed on a side of the light-permeable film, a light-shielding layer that is opaque and that is disposed on another side of the base color layer opposite the light-permeable film, and a protection layer disposed on a side of the light-shielding layer opposing the base color layer, wherein the portions of the light-shielding layer that respectively correspond to each of the plurality of keys are removed so as to form a plurality of light-transparent patterns.

According to one embodiment of the instant disclosure, the light-permeable film is a transparent flexible film, the base color layer is formed using a light-colored paint, the light-shielding layer is formed using a light-impermeable paint, the protection layer is a transparent UV-cured layer, the plurality of light-transparent patterns is formed by laser engraving the light-shielding layer with the plurality of light-transparent patterns, and the light-transparent patterns pass through the light-shielding layer.

According to one embodiment of the instant disclosure, the cover film further includes a plurality of middle color layers located between the base color layer and the light-shielding layer, each of the plurality of middle color layers having a color that is different from the colors of other middle color layers of the plurality of middle color layers, the plurality of light-transparent patterns extending towards the middle color layers until one of the middle color layers in a manner such that the light-transparent patterns can be displayed in the color of the middle color layer that is located under the transparent patterns and exposed therefrom.

According to one embodiment of the instant disclosure, the plurality of light-transparent patterns are formed by laser engraving the protection layer and the light-shielding layer with the light-transparent patterns after the protection layer is formed on the light-shielding layer, and pass through the protection layer and the light-shielding layer.

In order to further the understanding of the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in subsequent descriptions and appended drawings.

Figure 1:
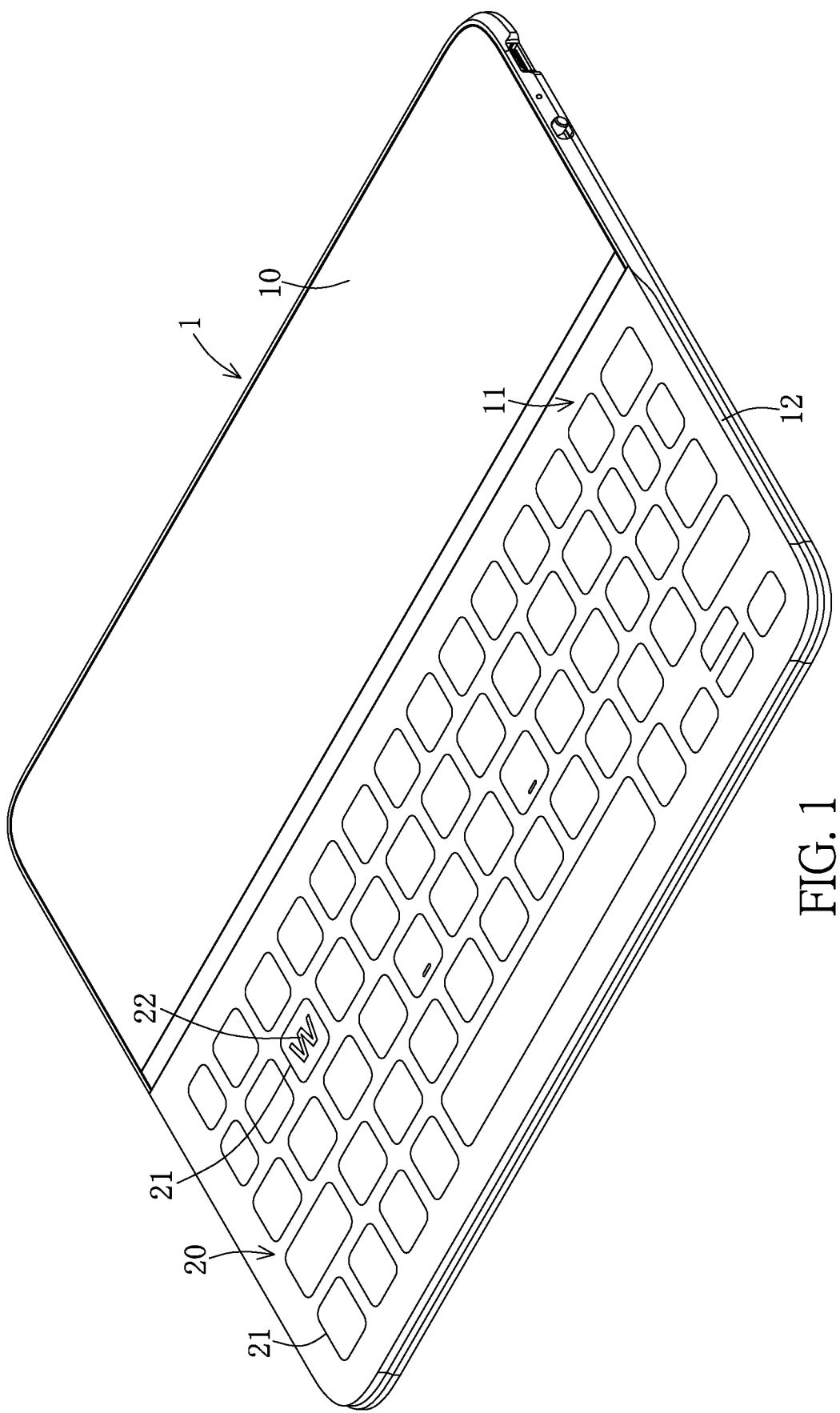
FIG. 1 is a schematic diagram of an illuminated film-covered keyboard according to one embodiment of the instant disclosure.
Figure 2:
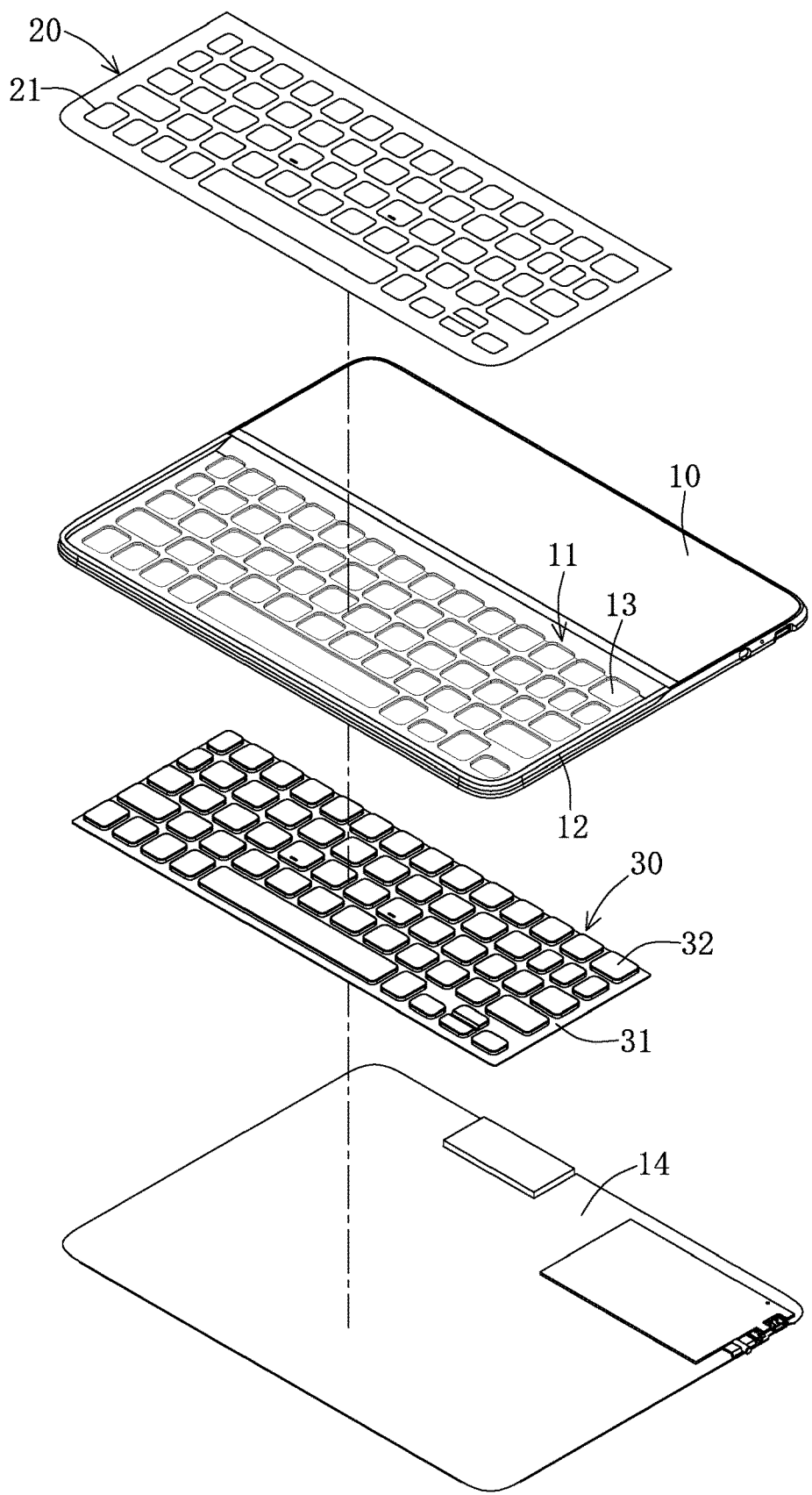
FIG. 2 is an exploded perspective view of the illuminated film-covered keyboard according to one embodiment of the instant disclosure.

As shown in FIG. 1 and FIG. 2, the instant disclosure provides an illuminated film-covered keyboard 1, the illuminated film-covered keyboard 1 comprising a frame body 10, a cover film 20, and a backlit keyboard module 30. In the present embodiment, the frame body 10 is made by a metal die casting process or a plastic injection molding process. The frame body 10 includes a key area 11 on a side thereof, the key area 11 having a plurality of keycap through holes 13, the backlit keyboard module 30 being disposed in the key area 11 of the frame body 10. A plurality of keys 32 of the backlit keyboard module 30 can pass through the plurality of keycap through holes 13, and the top surface of each key 32 is located above the key area 11 of the frame body 10. The frame body 10 further includes a bottom cover 14, disposed on the bottom surface of the frame body 10 in such a manner that the bottom surface of the frame body 10 is a closed surface and encloses the backlit keyboard module 30 such that the backlit keyboard module 30 is situated inside the frame body 10.

In the present embodiment, the frame body 10 includes a frame border 12 surrounding the key area 11. The edge of the cover film 20 fits the frame border 12 of the frame body 10 and covers the top surface of each key 32 of the backlit keyboard module 30. The cover film 20 is a flexible thin film as shown in FIG. 1. The cover film 20 includes a plurality of key patches 21, each of which corresponds to each key 32 and has a light-transparent pattern 22. Each light-transparent pattern 22 represents the symbol or command that will be inputted by the corresponding key 32 when the corresponding key patch 21 is pressed by a user.

Figure 3:
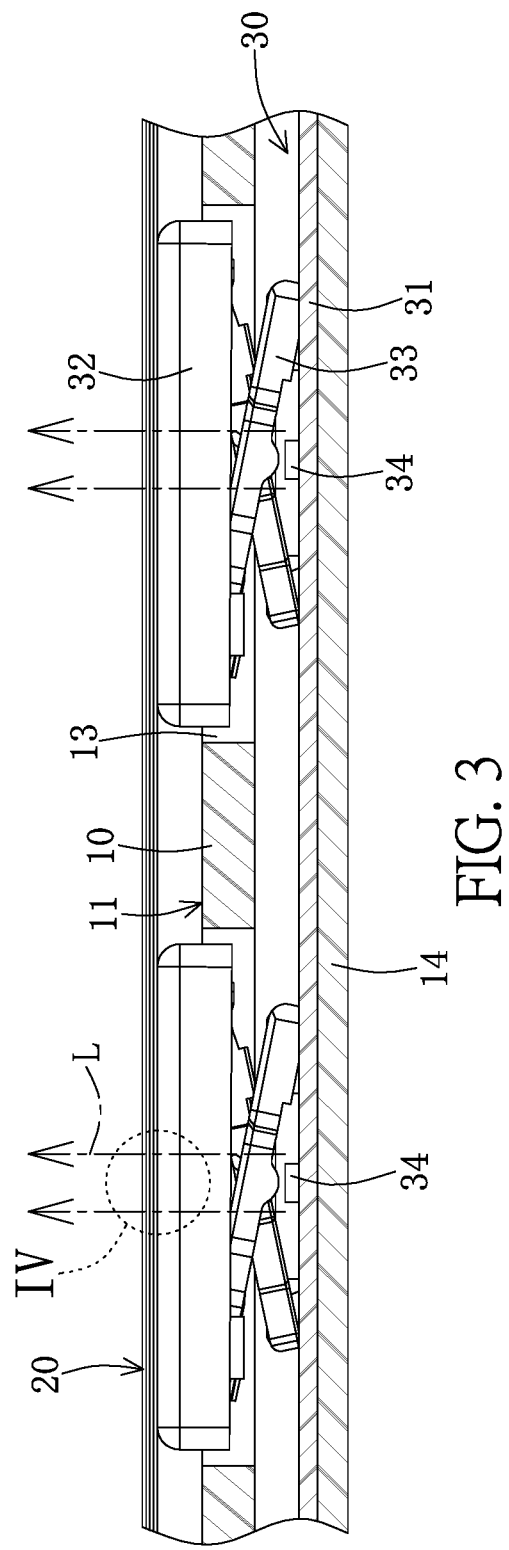
FIG. 3 is a partial sectional view of the illuminated film-covered keyboard according to one embodiment of the instant disclosure.

As shown in FIG. 2 and FIG. 3, the backlit keyboard module 30 includes a base plate 31. The plurality of keys 32 are connected to the base plate 31 through a plurality of scissor members 33 in a manner such that each key 32 can move up and down along the direction perpendicular to the base plate 31. In the present embodiment, the plurality of keys 32 can be light-permeable keys made of translucent plastic materials. The keys 32 can be entirely light permeable or partly light-permeable, in which the partly light-permeable keys 32 can be made by embedding translucent materials in part of the keys 32. The backlit keyboard module 30 further includes a plurality of backlight sources 34. In this embodiment, the backlight sources 34 are a plurality of LEDs disposed on the base plate 31 and facing the bottom surface of the keys 32. The light emitted by the backlight source 34 can be transmitted from the bottom surface of each key 32 to the top surface of each key 32. However, the backlight sources 34 are not limited to LEDs.

In other embodiments, the backlight sources 34 can be light guide components, cold cathode lamps, or other light-emitting elements.

As shown in FIG. 3, in this embodiment, the backlit keyboard module 30 is accommodated in a receiving space formed by the bottom cover 14 together with the frame body 10. The plurality of keys 32 pass through the plurality of keycap through holes 13 of the frame body 10 such that the top surface of each key 32 is located above the key area 11. The light L emitted from the backlight source 34 can be transmitted from the bottom surface of the keys 32 to the top surface of the keys 32. The cover film 20 is attached to the top surface of each key 32. Please refer to FIG. 4. As mentioned above, each key patch 21 corresponding to each key 32 includes a light-transparent pattern 22, and thus the light passing through the top surface of each key 32 can further be transmitted through the light-transparent pattern 22 so that each light-transparent pattern 22 is rendered luminous.

Figure 4:
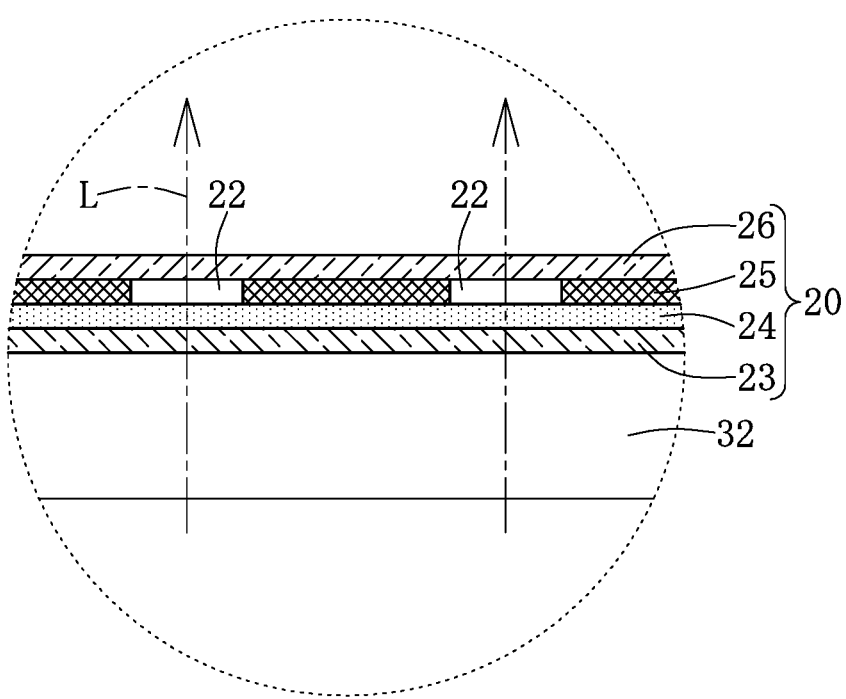
FIG. 4 is an enlarged view of a portion of the illuminated film-covered keyboard shown in FIG. 3.

As shown in FIG. 4, the cover film 20 includes a light-permeable film 23, a base color layer 24, a light-shielding layer 25, and a protection layer 26. The light-permeable film 23 is a flexible transparent thin film made of transparent materials such as PU (Polyurethane), TPU (Thermoplastic Polyurethane), and PE (Polyethylene). The base color layer 24 can be made of white paint or other light-colored paints. The base color layer 24 is applied on a side of the light-permeable film 23. The light-shielding layer 25 is disposed on another side of the base color layer 24 opposite the light-permeable film 23, the light-shielding layer 25 being opaque and made of paint in a color that is in contrast to the color of the base color layer 24. For example, the color of the light-shielding layer 25 can be black, dark grey, navy blue, etc. The protection layer 26 is disposed on another side of the light-shielding layer 25 opposite the base color layer 24, and is made of UV-cured paint. The protection layer 26 is transparent and has the property of friction durability, which enables the protection layer 26 to protect the light-shielding layer 25 and the light-transparent patterns 22 formed on the light-shielding layer 25. However, in other embodiments, the light-permeable film 23 and the base color layer 24 can be made of the same material. For instance, the light-permeable film 23 can be made of the same transparent material as that of the base color layer 24 and in the same color as that of the base color layer 24, such that when light passes through the light-permeable film 23, the light-permeable film 23 is shown in the same color as that of the base color layer 24. That is to say, the light-permeable film 23 and the base color layer 24 can be combined into one material layer.

As shown in FIG. 4, in the present embodiment, the portions of the light-shielding layer 26 that respectively correspond to each of the plurality of keys 32 are removed so as to form a plurality of light-transparent patterns 22. It is noted that, in this embodiment, the laser engraving process is performed within the light-shielding layer 25 so that the light-transparent patterns 22 do not extend toward the base color layer 24. In this way, the parts of the base color layer 24 that are exposed from the light-transparent patterns 22 remain complete. The light L transmitted through the keys 32 will first pass through the light-permeable film 23 and the base color layer 24 and then through the light-shielding layer 25 via the light-transparent patterns 22. The light-transparent patterns 22 are shown in the color of the base color layer 24.

Figure 5:
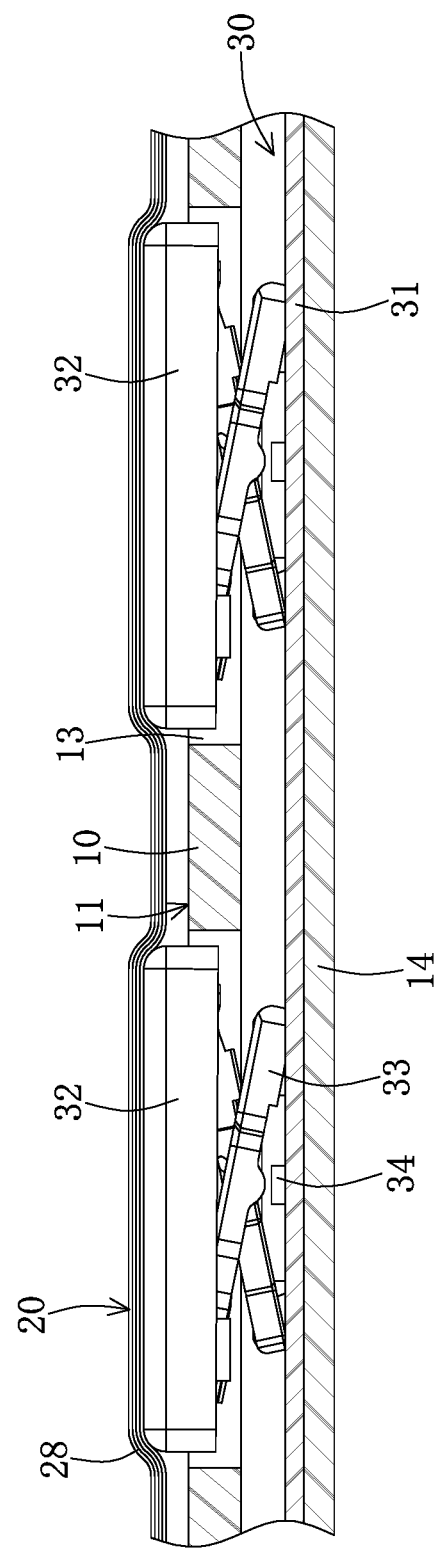
FIG. 5 is a partial sectional view of the illuminated film-covered keyboard according to another embodiment of the instant disclosure.

As shown in FIG. 5, the cover film 20 includes a plurality of accommodating portions 28 respectively corresponding to each top surface of each of the plurality of keys 32, the top surface of each of the plurality of keys 32 being accommodated in each of the plurality of accommodating portions 28. In this embodiment, the connection between each accommodating portion 28 and each key 32 prevents horizontal displacement of the cover film 20, enabling the cover film 20 to be disposed on the keys 32 accurately.

Figure 6:
FIG. 6 to FIG. 10 illustrate a manufacturing process of the cover film used in the illuminated film-covered keyboard of the instant disclosure.
Figure 7:
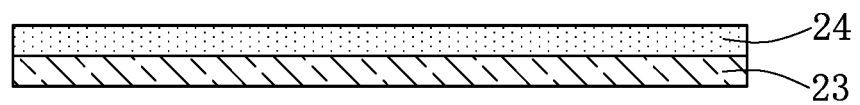
Figure 8:
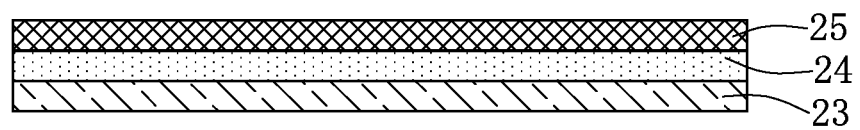
Figure 9:
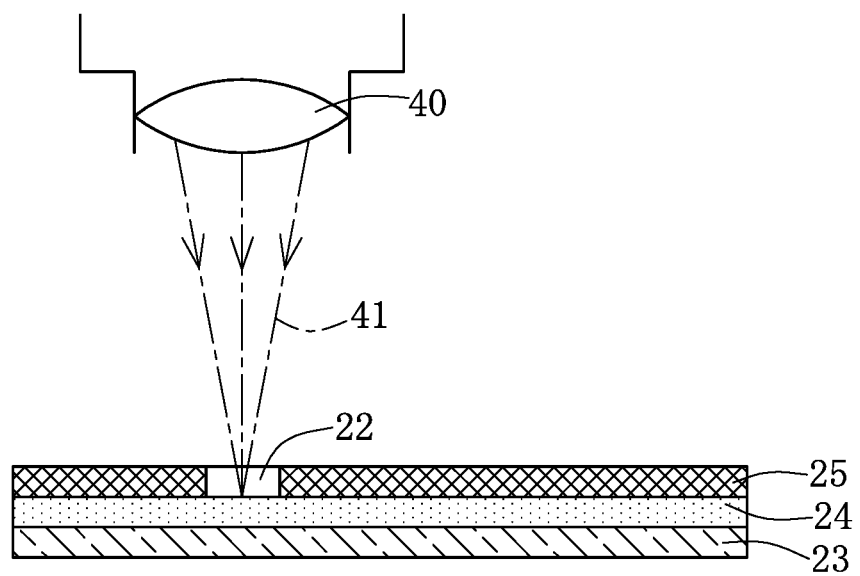
Figure 10:
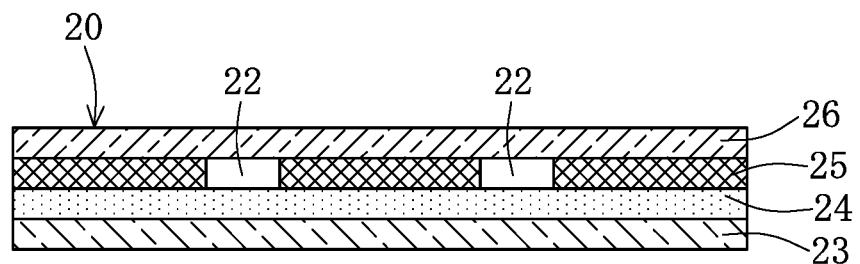

The manufacturing method of the cover film 20 is described below. As shown in FIG. 6, the first step of manufacturing the cover film 20 is preparing a light-permeable film 23; then, as shown in FIG. 7, forming the base color layer 24 on one side of the light-permeable film 23. However, in other embodiments, the light-permeable film 23 and the base color layer 24 can be combined into one single layer. Afterwards, as shown in FIG. 8, a light-shielding layer 25 is formed on the surface of the base color layer 24 after the base color layer 24 is formed. As shown in FIG. 9, in the first embodiment of the instant disclosure, the light-transparent patterns 22 are formed by engraving the light-shielding layer 25 with the light-transparent patterns 22 using a laser head 40 which generates a laser beam 41 in a manner such that a part of the light-shielding layer 25 is removed and the structure of the light-transparent patterns 22 is shown. Since the light-shielding layer 25 is hollow at the light-transparent patterns 22, light can only pass through the light-shielding layer 25 via the light-transparent patterns 22. Next, as shown in FIG. 10, after the light-transparent patterns 22 are formed on the light-shielding layer 25, a UV-cured layer is formed on the light-shielding layer 25 by applying a layer of UV-curable paint on the light-shielding layer 25 and curing the layer of UV-curable paint with UV so as to form the protection layer 26.

Through the above manufacturing process, a cover film 20 with a plurality of light-transparent patterns 22 can be formed. In the laser engraving process, a numerical control method is utilized to control a laser engraving machine to engrave the light-transparent patterns 22 on the light-shielding layer 25. By this means, the instant disclosure dispenses with the need of the jigs and molds and thus reduces the cost of and simplifies the manufacturing process of the cover film 20. Furthermore, after the light-transparent patterns 22 are engraved on the light-shielding layer 25, the light-shielding layer 25 is covered by a protection layer 26, thereby protecting the light-transparent patterns 22 from damage caused by friction. Therefore, the cover film 20 of the instant disclosure can still display clear key patterns even after long-term use.

Figure 11:
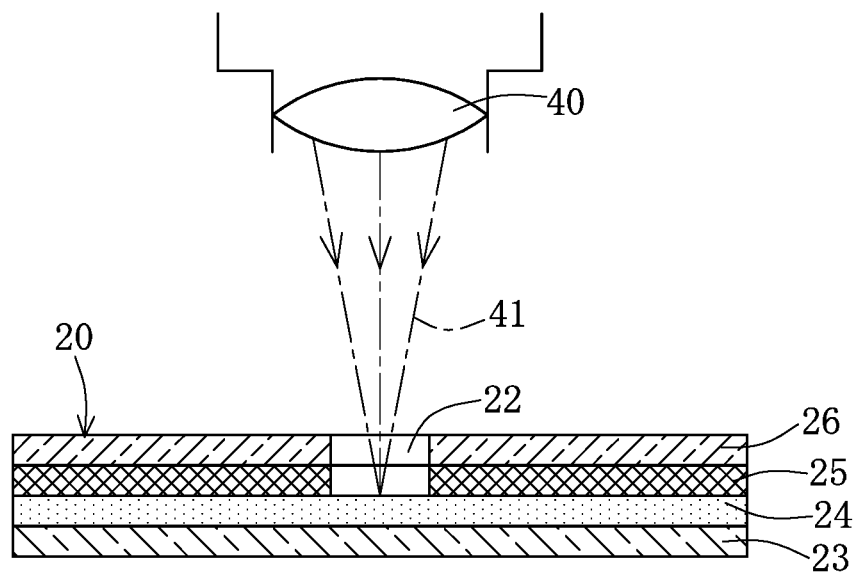
FIG. 11 illustrates a manufacturing process of the cover film used in the illuminated film-covered keyboard according to one embodiment of the instant disclosure in which the light-transparent patterns of the cover film are formed by laser engraving the protection layer and the light-shielding layer with the light-transparent patterns after the protection layer is formed on the light-shielding layer.

As shown in FIG. 11, the plurality of light-transparent patterns 22 can also be formed by laser engraving the protection layer 26 and the light-shielding layer 25 with the light-transparent patterns 22 after the protection layer 26 is formed on the light-shielding layer 25. In this way, the plurality of light-transparent patterns 22 pass through the protection layer 26 and the light-shielding layer 25 at the same time. In the present embodiment, since the light-transparent patterns 22 are formed in the protection layer 26 and the light-shielding layer 25 after the protection layer 26 is formed on the light-shielding layer 25, the cover film 20 without the light-transparent patterns 22 can first be installed on a keyboard and, once an order has been placed therefor, a set of light-transparent patterns 22 customized in accordance with a buyer's needs can be formed on the cover film 20. The customization of an illuminated film-covered keyboard is thereby achieved.

Figure 12:
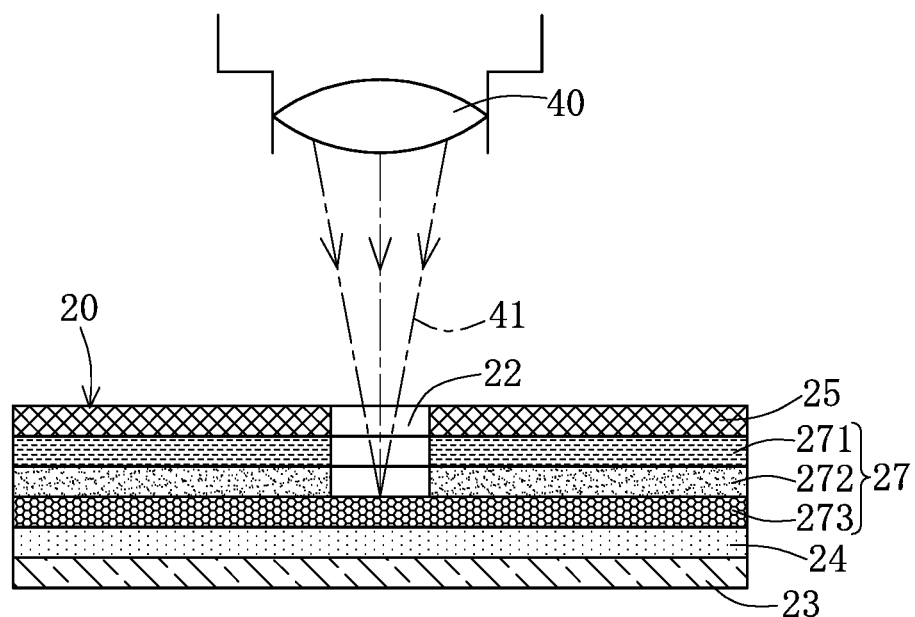
FIG. 12 and FIG. 13 illustrate a manufacturing process of the cover film used in the illuminated film-covered keyboard in which the cover film includes a plurality of middle color layers located between the base color layer and the light-shielding layer.
Figure 13:
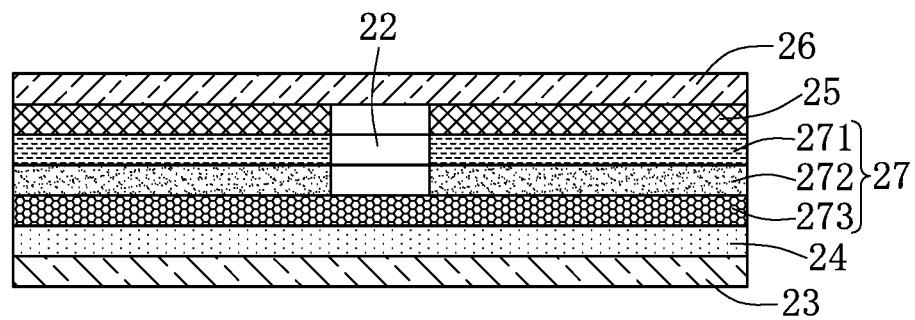

As shown in FIG. 12 and FIG. 13, in another embodiment of the cover film 20, the cover film 20 further includes a plurality of middle color layers 27. The middle color layers 27 include a first middle color layer 271 in a first color, a second middle color layer 272 in a second color, and a third middle color layer 273 in a third color. As shown in FIG. 12, the process of manufacturing the cover film 20 according to the present embodiment includes forming the middle color layers 27 on the base color layer 24 after the base color layer 24 is formed on the light-permeable film 23, then forming the light-shielding layer 25 on the middle color layers 27, and then forming the light-transparent patterns 22 by performing the laser engraving process. Afterwards, the protection layer 26 is formed on the light-shielding layer 25 after the light-transparent patterns 22 are formed.

In this embodiment, when forming the light-transparent patterns 22, the light-transparent patterns 22 can extend toward one of the first middle color layer 271, the second middle color layer 272, and the third middle color layer 273 such that the light-transparent patterns 22 can be shown in the color of the middle color layer 27 that is located under the light-transparent patterns 22 and exposed therefrom. Needless to say, the light-transparent patterns 22 may pass through the entire middle color layers 27 to display the color of the base color layer 24.

When making the cover film 20 disclosed in FIG. 12 and FIG. 13, the plurality of light-transparent patterns 22 can be engraved with different engraving depths so that the light-transparent patterns 22 can show different background colors.

The main characteristics of the cover film used in the illuminated film-covered keyboard include:

1. The light-transparent patterns 22 are formed by laser engraving the light-shielding layer 25 with the light-transparent patterns 22. In this way, the instant disclosure dispenses with the jigs and molds used in the prior art, reducing the cost of the cover film and simplifying the manufacturing process thereof.
2. Instead of using paint to form the light-transparent patterns 22, the light-transparent patterns 22 of the instant disclosure are formed on the light-shielding layer 25 by laser engraving, and the light-shielding layer 25 is further covered by the protection layer 26 after the light-transparent patterns 22 are formed. Therefore, the light-transparent patterns 22 can be durable under long-term use.
3. The light-transparent patterns 22 are light permeable and can display the color of the base color layer 24 or the colors of the middle color layers 27. Together with a backlight module, an illuminated backlit keyboard is achieved.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:
1. An illuminated film-covered keyboard, comprising:
a backlit keyboard module which includes a plurality of keys that are light-permeable, and at least one backlight source, each of the plurality of keys having a top surface and a bottom surface opposite the top surface, the at least one backlight source being adjacent to the plurality of keys;
a frame body disposed on the backlit keyboard module, the frame body including a key area, wherein the key area has a plurality of keycap through holes, and the plurality of keys are disposed in the plurality of keycap through holes respectively; and a cover film disposed at the key area and covering the top surface of each of the plurality of keys and a top surface of the frame body, wherein a top surface of the cover film corresponding to the top surface of each of the plurality of keys and the top surface of the cover film corresponding to the top surface of the frame body are non-coplanar, wherein the cover film includes a light-permeable film, a base color layer disposed on a side of the light-permeable film, a light-shielding layer that is opaque and is disposed on another side of the base color layer opposite the light-permeable film, and a protection layer disposed on a side of the light-shielding layer opposing the base color layer, wherein a plurality of light-transparent patterns are formed in the light-shielding layer corresponding to the plurality of keys, and wherein the cover film includes a protrusion protruding toward the frame body, and a bottom surface of the protrusion is lower than the top surface of each of the plurality of keys.

2. The illuminated film-covered keyboard according to claim 1, wherein the light-permeable film is a transparent flexible film, the base color layer being formed using a light-colored paint, the light-shielding layer being formed using a light-impermeable paint, the protection layer being a transparent UV-cured layer, the plurality of light-transparent patterns being formed by laser engraving the light-shielding layer with the plurality of light-transparent patterns, the light-transparent patterns passing through the light-shielding layer.

3. The illuminated film-covered keyboard according to claim 2, wherein the cover film further includes a plurality of middle color layers located between the base color layer and the light-shielding layer, each of the plurality of middle color layers having a color that is different from the colors of other middle color layers of the plurality of middle color layers, the plurality of light-transparent patterns extending towards the middle color layers until one of the middle color layers in a manner such that the light-transparent patterns can be shown in the color of the middle color layer that is located under the transparent patterns and exposed therefrom.

4. The illuminated film-covered keyboard according to claim 2, wherein the plurality of light-transparent patterns are formed by laser engraving the protection layer and the light-shielding layer with the light-transparent patterns after the protection layer is formed on the light-shielding layer, the plurality of light-transparent patterns passing through the protection layer and the light-shielding layer.

5. The illuminated film-covered keyboard according to claim 1, wherein an edge of the cover film fits an edge of the key area.

6. The illuminated film-covered keyboard according to claim 1, wherein the cover film includes a plurality of accommodating portions respectively corresponding to each top surface of each of the plurality of keys, the top surface of each of the plurality of keys being accommodated in each of the plurality of accommodating portions.

7. The illuminated film-covered keyboard according to claim 1, wherein each of the plurality of keys is connected to a base plate through a scissor member, the at least one backlight source being disposed on a side of the base plate facing the bottom surface of each of the plurality of keys.

8. The illuminated film-covered keyboard according to claim 1, wherein the top surface of each of the plurality of keys protrudes out of the frame body through the corresponding keycap through hole.

9. The illuminated film-covered keyboard according to claim 1, wherein the cover film is arranged to completely cover the plurality of keycap through holes in a seamless manner.

10. The illuminated film-covered keyboard according to claim 1, wherein the plurality of keys and the frame body are arranged on the same side of the cover film.

11. The illuminated film-covered keyboard according to claim 1, wherein the base color layer is arranged to be flat without any protruding portion filling the plurality of light-transparent patterns.

12. The illuminated film-covered keyboard according to claim 1, wherein the top surface of the cover film is uncovered, and the cover film and the frame body are arranged with an interval there-between.

13. The illuminated film-covered keyboard according to claim 1, wherein the cover film is an outermost layer of the illuminated film-covered keyboard.

14. The illuminated film-covered keyboard according to claim 1, wherein the protrusion protrudes from a side of the cover film and an opposite side of the cover film has a recessed portion corresponding to the protrusion so that a cross-sectional thickness of the cover film is constant.

15. A cover film for an illuminated film-covered keyboard, wherein the illuminated film-covered keyboard including a plurality of keys that are light-permeable, a frame border of a frame body surrounding the plurality of keys, and a bottom cover being disposed below the plurality of keys, the cover film comprising:

a light-permeable film, the light-permeable film being a flexible transparent thin film;

a base color layer, the base color layer being disposed on a side of the light-permeable film;

a light-shielding layer that is opaque and is disposed on another side of the base color layer opposite the light-permeable film, wherein the portions of the light-shielding layer that respectively correspond to each of the plurality of keys are removed so as to form a plurality of light-transparent patterns, and the base color layer is arranged between the plurality of light-transparent patterns and the light-permeable film, wherein the cover film covers a top surface of each of the plurality of keys, and an edge of the cover film fits an edge of the frame border and a width of the bottom cover, and wherein the cover film includes a protrusion protruding toward the frame body, and a bottom surface of the protrusion is lower than the top surface of each of the plurality of keys.

16. The cover film according to claim 15, wherein the cover film further comprises a plurality of middle color layers located between the base color layer and the light-shielding layer, each of the plurality of middle color layers having a color that is different from the colors of other middle color layers of the plurality of middle color layers, the plurality of light-transparent patterns extending toward the plurality of middle color layers until one of the plurality of middle color layers in such a manner that the light-transparent patterns can be shown in the color of the middle color layer that is located under the light-transparent patterns and exposed therefrom.

17. The cover film according to claim 15, wherein the plurality of light-transparent patterns are formed by laser engraving the protection layer and the light-shielding layer with the light-transparent patterns after the protection layer is formed on the light-shielding layer, the plurality of light-transparent patterns passing through the protection layer and the light-shielding layer.

18. The cover film according to claim 15, wherein the base color layer is arranged to be flat without any protruding portion filling the plurality of light-transparent patterns.

19. An illuminated film-covered keyboard, comprising:
a backlit keyboard module which includes a plurality of keys that are light-permeable, and at least one backlight source, each of the plurality of keys having a top surface and a bottom surface opposite the top surface, the at least one backlight source being arranged underneath the bottom surface of the plurality of keys in a manner such that the light emitted from the at least one backlight source is transmitted from the bottom surface of the plurality of keys to the top surface of the plurality of keys;
a frame body disposed on the backlit keyboard module, the frame body including a plurality of keycap through holes, wherein the plurality of keys are disposed in the plurality of keycap through holes respectively, and the top surface of each of the plurality of keys protrudes from a top surface of the frame body; and
a cover film covering the top surface of each of the plurality of keys and the top surface of the frame body, and being an outermost layer of the illuminated film-covered keyboard,
wherein the cover film includes a light-permeable film, a base color layer disposed on a side of the light-permeable film, a light-shielding layer disposed on a side of the base color layer opposite to the light-permeable film, and a protection layer disposed on a side of the light-shielding layer opposing the base color layer,
wherein a plurality of light-transparent patterns are disposed in the light-shielding layer corresponding to the plurality of keys, and
wherein the cover film includes a protrusion protruding toward the frame body, and a bottom surface of the protrusion is lower than the top surface of each of the plurality of keys.

20. The illuminated film-covered keyboard according to claim 19, wherein a top surface of the cover film is uncovered, and the cover film and the frame body are arranged with an interval there-between.

* * * * *